United States Patent
Lev-Tov et al.

(10) Patent No.: US 11,170,168 B2
(45) Date of Patent: Nov. 9, 2021

(54) UNSUPERVISED ADAPTATION OF SENTIMENT LEXICON

(71) Applicant: Genesys Telecommunications Laboratories, Inc., Daly City, CA (US)

(72) Inventors: Amir Lev-Tov, Tel-Aviv (IL); Avraham Faizakof, Tel-Aviv (IL); Arnon Mazza, Givatayim (IL); Yochai Konig, San Francisco, CA (US)

( * ) Notice: Subject to any disclaimer, the term of this patent is extended or adjusted under 35 U.S.C. 154(b) by 0 days.

(21) Appl. No.: 16/381,452

(22) Filed: Apr. 11, 2019

(65) Prior Publication Data
US 2020/0327191 A1    Oct. 15, 2020

(51) Int. Cl.
| | | |
|---|---|---|
| G06F 40/284 | (2020.01) | |
| G06F 40/49 | (2020.01) | |
| G06F 17/18 | (2006.01) | |
| G10L 15/26 | (2006.01) | |
| G10L 25/63 | (2013.01) | |

(52) U.S. Cl.
CPC ........... *G06F 40/284* (2020.01); *G06F 17/18* (2013.01); *G06F 40/49* (2020.01); *G10L 15/26* (2013.01); *G10L 25/63* (2013.01)

(58) Field of Classification Search
CPC ........ G06F 40/30; G06F 40/284; G06F 40/49; G06F 17/18; G06F 40/20; G06F 40/237; G06F 40/295; G06F 16/95; G10L 15/26; G10L 25/63
See application file for complete search history.

(56) References Cited

U.S. PATENT DOCUMENTS

| | | | |
|---|---|---|---|
| 2008/0005051 A1 | 1/2008 | Turner et al. | |
| 2009/0193328 A1* | 7/2009 | Reis | G06N 5/025 715/231 |
| 2014/0149328 A1* | 5/2014 | Posse | G06N 5/04 706/46 |
| 2017/0220677 A1 | 8/2017 | Kazi et al. | |
| 2018/0260860 A1* | 9/2018 | Devanathan | G06F 16/345 |
| 2020/0065716 A1* | 2/2020 | Aharonov | G06F 40/30 |

FOREIGN PATENT DOCUMENTS

EP    2515242 A2    10/2012

OTHER PUBLICATIONS

PCT Written Opinion and International Search Report regarding co-pending PCT application No. PCT/US2020/027567 dated Jul. 24, 2020.
Sascha Rothe et al., "Ultradense Word Embeddings by Orthogonal Transformation", Arxiv. Org, Cornell University Library, 201 Olin Library Cornell University, Ithica, NY 14853, Feb. 24, 2016.

(Continued)

*Primary Examiner* — Yogeshkumar Patel

(57) ABSTRACT

A method, system, and computer program product for unsupervised automated generation of lexicons in a specified target domain, comprising tokens having domain-specific sentiment orientation, by selecting a seed set of tokens from a source lexicon; generating a candidate set of tokens from a text corpus in the target domain based on a similarity parameter with the seed set; calculating a sentiment score for each of the tokens in the candidate set; and automatically updating the source lexicon based on the candidate list.

14 Claims, 2 Drawing Sheets

(56) References Cited

OTHER PUBLICATIONS

William L. Hamilton et al., "Inducing Domain-Specific Sentiment Lexicons From Unlabeled Corpora", Arxiv. Org., Cornell University Library, 201 Olin Library Cornell University, Ithica NY 14853, Jun. 9, 2016.

Ji Fang et al., "Incorporating Lexicon Knowledge into SVM Learning to Improve Sentiment Classification", Proceedings of the Workshop on Sentiment Analysis where AI meets Psychology (SAAIP), IJCNLP 2011, Nov. 13, 2011.

* cited by examiner

UNSUPERVISED ADAPTATION OF SENTIMENT LEXICON

BACKGROUND

The invention relates to the field of automatic, computerized, sentiment analysis.

Sentiment analysis, also referred to as "opinion mining" or "emotion AI," is a method by which tools such as natural language processing (NLP), text analysis, computational linguistics, and machine learning, are used to determine opinions and feelings from a text. Sentiment analysis is typically applied to on-line ratings, social media posts, and other similar situations.

A comprehensive sentiment lexicon can provide a simple yet effective solution to sentiment analysis, because it is general and does not require prior training. Therefore, attention and effort have been paid to the construction of such lexicons. However, a significant challenge to this approach is that the polarity of many words is domain and context dependent. For example, 'long' is positive in 'long battery life' and negative in 'long shutter lag.' Current sentiment lexicons do not capture such domain and context sensitivities of sentiment expressions. They either exclude such domain and context dependent sentiment expressions or tag them with an overall polarity tendency based on statistics gathered from certain corpus such as the world wide web accessed via the internet. While excluding such expressions leads to poor coverage, simply tagging them with a polarity tendency leads to poor precision.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in an embodiment, a method comprising: receiving a source lexicon comprising a plurality of tokens, wherein each of said tokens is associated with a sentiment parameter; automatically selecting, based on specified criteria, a seed set of said tokens from said source lexicon; automatically generating a candidate set of tokens from a text corpus comprising a plurality of tokens associated with a target domain, based at least in part, on a similarity parameter between each of said tokens in said candidate set and said seed set, wherein said similarity parameter is obtained by applying a machine learning algorithm to calculate, for each of said tokens, an embedding vector in an embedding space; automatically calculating a sentiment score for each of said tokens in said candidate set, based, at least in part, on said similarity parameters; and automatically updating said source lexicon by (i) for each token in said candidate set which does not exist in said source lexicon, adding said token to said source lexicon, and (ii) for each token in said candidate set which exists in said source lexicon, adjusting said sentiment parameter of said token based, at least in part, on interpolating said sentiment parameter and said sentiment score.

There is also provided, in an embodiment, a system comprising at least one hardware processor; and a non-transitory computer-readable storage medium having stored thereon program instructions, the program instructions executable by the at least one hardware processor to: receive a source lexicon comprising a plurality of tokens, wherein each of said tokens is associated with a sentiment parameter, automatically select, based on specified criteria, a seed set of said tokens from said source lexicon, automatically generate a candidate set of tokens from a text corpus comprising a plurality of tokens associated with a target domain, based at least in part, on a similarity parameter between each of said tokens in said candidate set and said seed set, wherein said similarity parameter is obtained by applying a machine learning algorithm to calculate, for each of said tokens, an embedding vector in an embedding space, automatically calculate a sentiment score for each of said tokens in said candidate set, based, at least in part, on said similarity parameters, and automatically update said source lexicon by: (i) for each token in said candidate set which does not exist in said source lexicon, adding said token to said source lexicon, and (ii) for each token in said candidate set which exists in said source lexicon, adjusting said sentiment parameter of said token based, at least in part, on interpolating said sentiment parameter and said sentiment score.

There is further provided, in an embodiment, a computer program product, the computer program product comprising a non-transitory computer-readable storage medium having program code embodied therewith, the program code executable by at least one hardware processor to: receive a source lexicon comprising a plurality of tokens, wherein each of said tokens is associated with a sentiment parameter; automatically select, based on specified criteria, a seed set of said tokens from said source lexicon; automatically generate a candidate set of tokens from a text corpus comprising a plurality of tokens associated with a target domain, based at least in part, on a similarity parameter between each of said tokens in said candidate set and said seed set, wherein said similarity parameter is obtained by applying a machine learning algorithm to calculate, for each of said tokens, an embedding vector in an embedding space; automatically calculate a sentiment score for each of said tokens in said candidate set, based, at least in part, on said similarity parameters; and automatically update said source lexicon by: (i) for each token in said candidate set which does not exist in said source lexicon, adding said token to said source lexicon, and (ii) for each token in said candidate set which exists in said source lexicon, adjusting said sentiment parameter of said token based, at least in part, on interpolating said sentiment parameter and said sentiment score.

In some embodiments, said sentiment parameter comprises at least a sentiment orientation and a confidence score associated with said sentiment orientation.

In some embodiments, said interpolating comprises assigning weights to said sentiment parameter and said sentiment score based, at least in part, on said confidence score of said token.

In some embodiments, said selecting comprises at least some of: selecting said tokens with said sentiment parameter above a specified threshold; selecting said tokens with said confidence score above a specified threshold; filtering said tokens which are stop words; filtering said tokens which are named entities; filtering said tokens beginning or ending in punctuation marks; filtering said tokens comprising a single letter; filtering said tokens which are dates; and filtering said tokens which are prepositions.

In some embodiments, with respect to a token of said candidate set, said sentiment score is equal to a weighted average of all said similarity parameters of said token with each token of said seed set.

In some embodiments, said weightings are determined based, at least in part, on said sentiment orientations of said tokens of said seed set.

In some embodiments, said text corpus comprises textual transcriptions of contact center interactions, and wherein said interactions are between at least an agent and a customer.

In some embodiments, said calculating of said sentiments score for at least some of said tokens in said candidate list further comprises determining, for a token of said candidate list with respect to a token of said seed set: (i) a similarity score between said tokens of said candidate list and said seed set based on a co-occurrence parameter, and (ii) a ranking score for said token of said candidate list among all tokens of said candidate list, based on said respective similarity scores.

In some embodiments, the method further comprises determining, and the program instructions are further executable to determine, an antonym relationship between said tokens of said candidate list and said seed set, based, at least in part, on a specified threshold associated with each of said similarity scores, said ranking scores, and said similarity parameters associated with said tokens of said candidate list and said seed set.

In some embodiments, said co-occurrence parameter is based, at least in part, on a frequency of occurrence of said tokens of said candidate list and said seed set within a text.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Figure 1:
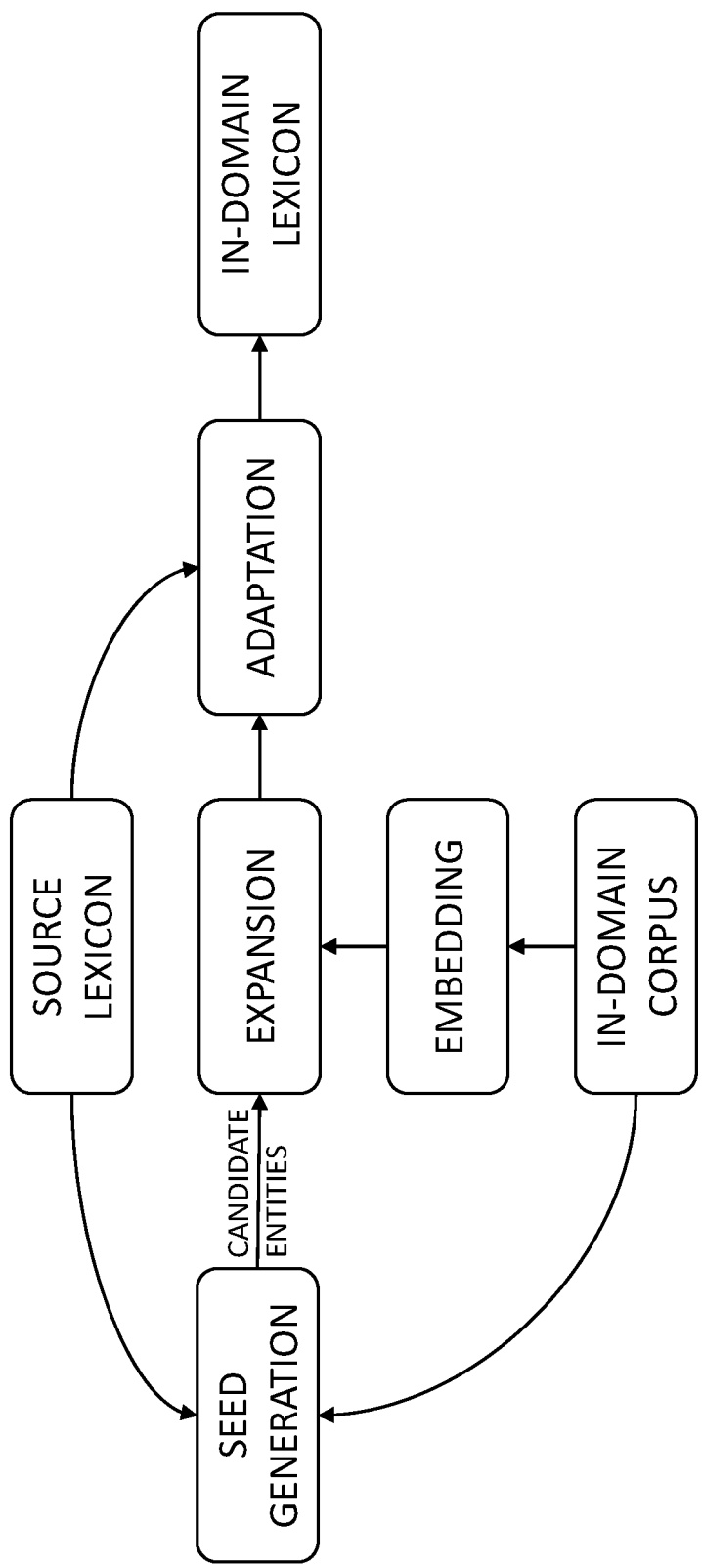
FIG. 1 is a schematic illustration of a process for unsupervised automated generation of lexicons in a specified domain, according to an embodiment.

Disclosed herein are a method, system, and computer program product for unsupervised automated generation of lexicons in a specified domain, comprising tokens having domain-specific sentiment orientation.

As used herein, the term 'lexicon' refers to a dictionary of tokens and their associated sentiment polarities and scores. Lexicon tokens may comprise any n-gram sequence of, e.g., tokens, words, etc. (i.e., unigrams, bigrams, trigrams, etc.). A lexicon may include a semantic or sentiment orientation of each token (e.g., 'positive,' 'neutral,' and 'negative'), as well as an orientation score indicating the strength of the orientation (such as a value between 0% and 100%, which indicates the probability or the confidence that the token indeed possesses that polarity). Alternatively, it is also possible to represent the semantic orientation and its strength on a single scale, such as between [−1,1], wherein an orientation score of −1 is an absolute negative, 0 is an absolute neutral, and 1 is an absolute positive, with intermediary values representation where the orientation stands between negative and neutral as well as between positive and neutral.

In the following, for purposes of explanation, the sentiment classification task is primarily directed to the context of contact or call centers (CC), to provide for sentiment analysis of tokens used in general customer service interactions.

In some embodiments, the term 'domain' may refer to, e.g., a specified business area of customer service (e.g., wireless phone services, banking, or retail); a specified vendor (e.g., Amazon, Verizon); and/or a specified customer service area (e.g., billing, technical support).

As discussed above, the sentiments of many words or phrases are context- or domain-dependent. For example, 'long' is positive if it is associated with, e.g., the aspect of 'battery life' of a product. However, the same word carries negative sentiment when it is associated with, e.g., wait times. Therefore, it is critical to know the topic/domain being discussed when trying to determine the associated sentiment. Based on this observation, domain/topic specific lexicons are built covering both expressions indicating a specific domain and expressions indicating different sentiments associated with that particular domain.

Accordingly, in some embodiments, the present disclosure provides for an algorithm which performs an unsupervised adaptation of a provided source lexicon in a source domain into a sentiment lexicon in a target domain, by at least one of (i) modifying a sentiment orientation of existing tokens in the source lexicon to the specified domain, and (ii) incorporating new tokens acquired from an in-domain corpus.

Typically, the adaptation of lexicons into new domains is done manually, e.g., by specialized personnel which choose or define tokens and assign them a polarity based on specific domain knowledge.

A potential advantage of the present algorithm is, therefore, in that it provides or an automated, unsupervised creation of sentiment lexicons in new domains, thereby reducing the reliance on costly manual supervision and annotation.

In some embodiments, generating a sentiment lexicon in a new domain may comprise adapting a source lexicon to the new domain. In some embodiments, the unsupervised adaptation is performed by expanding a seed of tokens generated from the source lexicon in the source domain, into a broader expansion list comprising tokens with sentiment orientation in the target domain. In some embodiments, this expansion list is then incorporated into the source lexicon, to generate a sentiment lexicon in the target domain.

In some embodiments, a sentiment lexicon in a target domain may be deployed to perform sentiment analysis on textual and/or verbal messages, such as telephone call recordings, transcripts, and/or written communications. Techniques disclosed herein are particularly useful for sentiment analysis of call transcripts recorded in call centers, due to special characteristics of this type of human interaction. In the contact center domain, a customer service center may receive interactions in the form of voice calls (that are later transcribed), or raw text from chats, text messages, emails, social media, Internet forum postings, and the like. The interactions are typically processed via a plurality of analysis techniques to provide, e.g., speech analytics (in the case of voice calls), topic classification, search and indexing capabilities, data mining, and/or other content-related data.

Some of the unique characteristics that are typical to sentiment analysis (SA) in the CC domain are:

CC interactions are multi-modal (e.g., voice calls, chats, text messaging, email, internet postings, etc.), wherein the interaction modality may affect SA modelling.

In most CC interaction modalities, and especially in voice calls and chat conversations, the interaction is at least two sided, comprising of, e.g., an agent and a customer. Accordingly, recovering SA from these interactions may require analyzing both sides of the interaction.

CC interactions may reflect conversations of varying lengths (e.g., from a few minutes to more than one hour). Therefore, SA in the CC domain may involve detecting 'local' sentiments, e.g., in various segments of the interaction, as well as a 'global' sentiment affecting the interaction as a whole.

CC interactions, especially lengthy ones, may shift in tone and sentiment over the course of the interaction, and have a defined sentiment 'flow.' For example, an interaction may start with a positive sentiment and end on a more negative one, or may switch back and forth between positive and negative. Therefore, SA in the CC domain may require accurate segmentation of interactions, based on sentiment shifts.

Because many CC interactions are received as text transcripts of voice calls made by automatic speech recognition (ASR) systems, the input data may be noisy and affected by such issues as background noises, poor reception, speaker accent, and/or other errors originating in imperfect speech recognition.

In many CC interaction modalities, and especially in verbal interactions, the speech is informal and conversational, and does not resemble typical planned written materials. Accordingly, SA in the CC domain requires analyzing speech that is spontaneous and include, e.g., hesitations, self-repairs, repetition, and/or ill-defined sentence boundaries.

CC interactions may be subdomain-specific, wherein the subdomain may be, e.g., a general business area (e.g., wireless services, banking, retail), a specific vendor (e.g., Amazon, Verizon), and/or a specific customer service area (e.g., billing, tech support). Accordingly, SA in the CC domain may require subdomain-specific analysis models.

Reference is now made to FIG. 1 which is a high-level overview of the process for automatically generating a domain-specific sentiment lexicon from a base source lexicon.

In some embodiments, automatically generating a domain-specific lexicon from a source lexicon may comprise the following steps:
(i) Generating a seed lexicon comprising a selected subset of tokens from a source lexicon, based on specified selection criteria;
(ii) generating a set of candidate tokens from a corpus D of tokens in the target domain;
(iii) computing word embeddings for each candidate token in the corpus, by applying an embedding model;
(iv) calculating a score for each candidate token, based on its embedding similarity with each of the seed tokens; and
(v) generating a sentiment lexicon in the target domain by interpolating the candidate list with the source lexicon.

Figure 2:
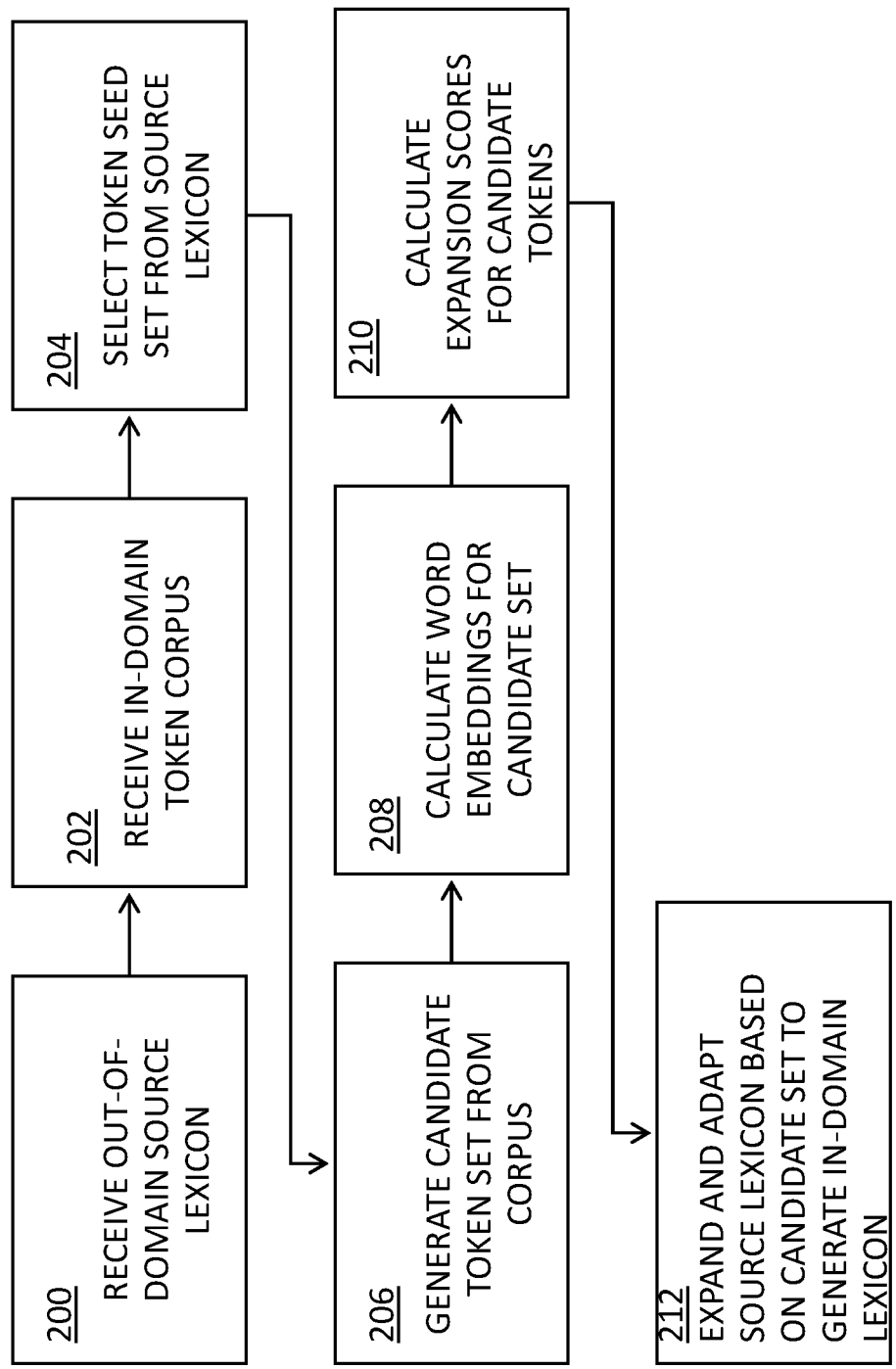
FIG. 2 is a flowchart of the functional steps in a process for unsupervised automated generation of lexicons in a specified domain, according to an embodiment.

FIG. 2 is a flow chart illustrating the functional steps in the present algorithm for generating a domain-specific sentiment lexicon from a base source lexicon.

In some embodiments, at a step 200 there is received a source sentiment lexicon. In some embodiments, the source lexicon is an out-of-domain lexicon. In some embodiments, the source lexicon may comprise a generic call center-related sentiment lexicon. In some embodiments, the source lexicon may comprise a plurality of n-gram tokens each having at least an associated sentiment orientation, wherein said sentiment orientation is associated with a sentiment confidence score.

At a step 202, there is received an in-domain corpus of tokens D. In some embodiments, corpus D may comprise a corpus of tokens obtained from, e.g., customer center call interactions. In some embodiments, corpus D may be obtained using, e.g., any speech recognition or analytics techniques, including large-vocabulary continuous speech recognition (LVCSR), speech-to-text techniques, full transcription, or automatic speech recognition (ASR).

In some embodiments, at a step 204, a set of seed tokens l may be selected from the source lexicon. In some embodiments, the source lexicon may comprise several thousand tokens, wherein a process of seed selection may comprise selecting and/or filtering tokens based at least on some of the following criteria:
(i) Selecting tokens with orientation scores above a specified threshold;
(ii) selecting tokens with sentiment orientations having a confidence score above a specified threshold;
(iii) merging tokens from one or more provided domain-specific lexicons;
(iv) selecting tokens based on intersecting the source lexicon with corpus D;
(v) filtering stop words (e.g., short function words such as the, is, at, which, and on);
(vi) filtering named entities (e.g., using named entities recognition methods);
(vii) filtering tokens beginning and/or ending in punctuation marks;
(viii) filtering tokens comprising a single letter;
(ix) filtering dates; and/or
(x) filtering prepositions (e.g., in, at, on, of, by, and is), and/or articles (a, an, the).

In some embodiments, seed set l may comprise between 50 and 500 tokens, e.g., 100 tokens.

In some embodiments, the present algorithm selects a top k seed words based, at least in part, on their absolute orientation score.

In some embodiments, a resulting set of seed tokens/may comprise a list of tokens and their orientation scores. Table 1 below shows an exemplary set of tokens which may comprise a portion of a seed set.

TABLE 1

Exemplary seed set.

| Token | Orientation Score |
| --- | --- |
| horrible | −0.9 |
| screw | −0.9 |
| unacceptable | −0.8 |
| mad | −0.8 |
| sad | −0.8 |
| stupid | −0.8 |
| ridiculous | −0.6 |
| violation | −0.6 |
| thankful | 0.3 |
| greatly | 0.5 |
| success | 0.6 |
| awesome | 0.7 |
| tremendous | 0.9 |
| impressed | 0.9 |
| fantastic | 1 |
| excellent | 1 |
| beautiful | 1 |

In some embodiments, at a step 206, the present algorithm may be configured to select a list of candidate tokens V from corpus D. In some embodiments, candidate list V may be generated by removing tokens in seed list 1 from the candidate list.

In some embodiments, at a step 208, word embeddings E may be calculated for the candidate set V. In some embodiments, calculating word embeddings E for tokens in corpus D comprises calculating a vector representation of each token which may capture at least some of contextual information of a token, semantic and syntactic similarity, relation with other words, and the like.

In some embodiments, candidate list V only comprises tokens having an associated embedding vector.

In some embodiments, word embeddings E may be calculated based, at least in part, on using models such as word2vec (see, Tomas Mikolov, Ilya Sutskever, Kai Chen, Greg Corrado, and Jeff Dean. 2013c. Distributed representations of words and phrases and their compositionality. In Proceedings of NIPS, pages 3111-3119, Lake Tahoe, Nev.).

In some embodiments, other methods and models may be used for calculating word embeddings E.

In some embodiments, at a step 210, after calculating word embeddings E, the present algorithm may be configured to calculate for each token in set V an 'expansion value.' In some embodiments, the expansion value represents the token's similarity in the embedding space with all the seed words in 1.

In some embodiments, the expansion value calculation comprises constructing embedding matrices $W_v$, $W_{l*}$ for tokens in the candidate set V and seed set 1 correspondingly, where * stands for {+, −}, a bisection of the lexicon to positive and negative terms.

Table 2 is an exemplary similarity matrix $W_{vl*}$, created by multiplying the embedding matrices $W_v$, $W_{l*}$: $W_{vl*} \leftarrow W_v W_{l*}^T$. In some embodiments, calculating a similarity value may comprise initially normalizing the row vectors of the matrix using, e.g., L2 normalization.

In the similarity matrix, each cell contains the computed similarity value at the intersection between the relevant seed (columns) and candidate (rows) tokens.

In some embodiments, the present algorithm comprises pruning the similarity matrix by applying, e.g., a similarity value threshold, and by retaining only the top $\frac{k_{sim}}{2}$ most similar words on an absolute value basis.

In some embodiments, the present algorithm is further configured to normalize the pruned orientation vectors L*, by dividing by the sum, using, e.g., L1 normalization.

In some embodiments, the present algorithm is configured to include antonyms in the expansion of the domain-specific lexicon. In some embodiments, A designates an antonyms where $(a_{ij}=-1 \text{ if } f \text{ Antonym-like}(W_i,l_j), o/w+1)$, as filled with each pair of seed and candidate words by the function described above. Accordingly:

$W A_{vl}* \leftarrow W_{vl}* \times A$, (element wise)

which returns $W A_{vl}+L^{+T} - W A_{vl}-L^{-T}$.

In some embodiments, an expansion value of a candidate token represents a sum of the (i) weighted positive similarities with all seed tokens, less (ii) the weighted negative similarities with all seed tokens.

In some embodiments, the present algorithm may employ, e.g., a pointwise mutual information (PMI) model to determine similarity values (see, e.g., Peter D. Turney, Thumbs up or thumbs down? semantic orientation applied to unsupervised classification of reviews, Proceedings of the 40th Annual Meeting on Association for Computational Linguistics, Jul. 7-12, 2002, Philadelphia, Pa.).

In some embodiments, the present algorithm may also comprise calculating a first order similarity of appearance in context of each seed/candidate pair. For this, context embedding may be used to predict the frequency of a given vocabulary word in a given context of another lexicon word. (See, e.g., Omer Levy and Yoav Goldberg. 2014b. Neural word embeddings as implicit matrix factorization. In Proceedings of NIPS; Goldberg, Y. (2017). Neural Network Methods for Natural Language Processing. Morgan & Claypool Publishers; Yoav Goldberg and Omer Levy. word2vec

TABLE 2

| | | Embedding matrix | | | | | |
|---|---|---|---|---|---|---|---|
| | | | | Seed Word | | | |
| Candidate | Estimation | Horrible | Screw | Sad | Awesome | Excellent | Impressed |
| Worn | −0.94 | ... | ... | ... | ... | ... | ... |
| Garbage | −0.89 | 0.5 | 0.5 | 0.8 | 0.6 | 0.7 | 0.6 |
| Counterfeit | −0.85 | ... | ... | ... | ... | ... | ... |
| Illegal | −0.82 | ... | ... | ... | ... | ... | ... |
| Defect | −0.78 | ... | ... | ... | ... | ... | ... |
| Frozen | −0.67 | ... | ... | ... | ... | ... | ... |
| Silly | −0.45 | ... | ... | ... | ... | ... | ... |
| Assist | 0.20 | ... | ... | ... | ... | ... | ... |
| Popular | 0.20 | ... | ... | ... | ... | ... | ... |
| Efficient | 0.25 | ... | ... | ... | ... | ... | ... |
| Concise | 0.30 | ... | ... | ... | ... | ... | ... |
| Enjoy | 0.38 | ... | ... | ... | ... | ... | ... |
| Terrific | 0.51 | 0.4 | 0.4 | 0.45 | 0.6 | 0.7 | 0.7 |
| Great | 0.67 | ... | ... | ... | ... | ... | ... | explained: deriving Mikolov et al.'s negative-sampling word embedding method. arXiv preprint arXiv:1402.3722, 2014.)

In some embodiments, the present algorithm may be configured to predict the context of a token, and derive the frequency in the index of seed set, for each l∈L, v∈V. The final score is the interpolation of that with previous computation of $W_{vl}^*$. (See, e.g., Marco Baroni, Georgiana Dinu, and German Kruszewski. Dont count, predict! a systematic comparison of context-counting vs. context-predicting semantic vectors. In ACL, 2014.)

In some embodiments, the present algorithm may employ semantic relations values from an external source, e.g., WordNet (see https://wordnet.princeton.edu; http://multi-wordnet.fbk.eu/english/licence.php).

In some embodiments, measuring similarity between embedding vectors as described above may result in pair of antonym words having high similarity values because they appear in similar contexts. Accordingly, in some embodiments, the present algorithm may be configured to identify these cases and filter them out.

In some embodiments, at the conclusion of step 210, there is generated an 'expansion list' $L_{exp}$ comprising selected candidate tokens and their expansion value.

In some embodiments, at a step 212, the present algorithm may be configured to perform an adaptation of source lexicon L using expansion list $L_{exp}$. In some embodiments, given source lexicon L and a set of expansion words $L_{exp}$ generated as explained in steps 204-210 above, the objective is to adapt the orientation values of tokens in L using $L_{exp}$ in an optimal manner.

In some embodiments, the adaptation may comprise adding to L only new out-of-lexicon tokens words from $L_{exp}$.

In some embodiments, mutual tokens in source lexicon L and expansion words set $L_{exp}$ may be interpolated.

In some embodiments, the present algorithm may be configured to consider a confidence value for each token in source lexicon L and expansion words $L_{exp}$.

In some embodiments, the confidence score may be derived during a lexicon generation stage, based, for example, on a count of the number of occurrences of each token in each sentiment polarity (i.e., positive, negative, and neutral). In some embodiments, the confidence may be derived using, e.g., a confidence function which summarize the degree of confidence in a certain sentiment value of a token.

In some embodiments, a heuristic method may be employed to calculate a confidence value given low count sets, wherein:

$Conf(X) = (1 - V(X))*\text{Tan } h(\alpha|X|)$, where V(X) is the variance in sample X, Tan h( ) is a sigmoid function, α is a scaling factor, and |X| is the length of X. This method provides for higher confidence where a token exhibits lower variance and/or a larger sample.

Table 1 below illustrates exemplary results given low counts.

TABLE 1

Confidence Results

| Token | Orient | Neg Count | Pos Count | Neu Count | Total Count | (1 − (x))* Tanh (Total) | Expert Rating | Conf. Orient |
|---|---|---|---|---|---|---|---|---|
| 1 | −1 | 1 | 0 | 0 | 1 | 0.1 | 2 | −0.1 |
| 2 | −1 | 2 | 0 | 0 | 2 | 0.2 | 4 | −0.2 |
| 3 | −0.5 | 1 | 0 | 1 | 2 | 0.15 | 3 | −0.075 |
| 4 | 0 | 1 | 1 | 0 | 2 | 0 | 1 | 0 |
| 5 | 0 | 0 | 0 | 2 | 2 | 0.2 | 4 | 0 |
| 6 | 0.25 | 1 | 2 | 1 | 4 | 0.12 | 3 | 0.03 |
| 7 | 0.25 | 0 | 1 | 3 | 4 | 0.31 | 5 | 0.08 |

In some embodiments, when considering confidence scores in the adaptation of the source lexicon L, the present algorithm may perform stronger adaptation for tokens with low confidence and vice versa, i.e., perform light adaptation for tokens with high confidence, where the weight is determined by the dynamic confidence of the token in question and the static global interpolation factor.

In some embodiments, an exemplary adaptation process may comprise the following steps:

AdaptLexicon (L, Lexp, α, max_conf)
  //max_conf is the maximum confidence threshold to adapt an existing word orientation in L
  //α is the weight of L in the linear interpolation of it with $L_{exp}$
  //$Confidence_L(w)$ is the confidence c of w, as given by lexicon L
  $L_{exp}'$ ← Filter $L_{exp}$ words by counts below min_cnt_th (counts in the target domain) or absolute orientation below min_abs_orient_th
  For each token w from $L'_{exp} \cup L$
    If ∉L
      Add w to L
    Else if $Confidence_L(w) \leq max_{conf}$ and w ∈$L_{exp}'$
      Generate a new interpolation factor
      α' = α*$Confidence_L(w)$
      Use α' to interpolate the two values L(w), $L_{exp}'(w)$ from the base and expansion lexicons respectively $L(w) \leftarrow \alpha'L(w) + (1-\alpha')L'exp(w)$ Return L In some embodiments, the present algorithm may be configured to detect antonyms (e.g., satisfied and dissatisfied), as well as words that are 'antonym-like' in the sense that they have generally opposite sentiments, though not necessarily completely totally opposite meanings (e.g., satisfied and disgusted). In some embodiments, when calculating similarity values between seed tokens and a given candidate w, the present algorithm may be configured to filter antonym-like tokens from this list, or treat them differently when generating a new sentiment score for w.

Generally, tokens such as words and phrases that co-occur frequently, can have the same sentiment polarity. Using this first order similarity assumption (similarity based on co-occurrence), together with the second order distributional similarity assumption about semantics (similarity based on context sharing), the present algorithm may extract a method to filter the cases with different sentiment polarity from embedding similarities, i.e., detecting the antonym-like cases. To strengthen the first assumption, it may be assumed, e.g., that in spoken speech, speakers may tend to repeat or paraphrase more than in a written one-sided textual content. In fact, that increases further the co-occurrence of semantically similar words.

Accordingly, in some embodiments, an exemplary filtering process of antonym-like tokens may comprise the following steps:

IsAntonym-like $(w_1, w_2)$
   context←PredictContext($w_1$)
   r←Rank($w_2$, context)
   s1←context[$w_2$]
   s2←Cos-sim($w_1, w_2$)//embeddings
   Return (s2>=min2nd) and [(s1<=max 1 st) or (r>=min_rank)]

where Rank(w, context) is the index location of w in the sorted list of similarities context, min2nd, max 1 st are the second and first order similarity thresholds correspondingly, and min_rank is the rank threshold.

Table 3 below provides several examples of the treatment of synonyms and antonyms by the present algorithm.

TABLE 3

| Token 1 | Token 2 | 1st order sim | Rank |
|---|---|---|---|
| Synonym-like | | | |
| supervisor | manager | 0.0039 | 8 |
| angry | upset | 0.0011 | 44 |
| frustrated | annoyed | 0.0035 | 14 |
| Antonym-like | | | |
| disgusted | thrilled | 0.00013 | 1021 |
| disgusted | satisfied | 0.00011 | 1383 |
| disappointed | pleased | 0.00059 | 118 |

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The description of a numerical range should be considered to have specifically disclosed all the possible subranges as well as individual numerical values within that range. For example, description of a range from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Experiments conducted and described above demonstrate the usability and efficacy of embodiments of the invention. Some embodiments of the invention may be configured based on certain experimental methods and/or experimental results; therefore, the following experimental methods and/or experimental results are to be regarded as embodiments of the present invention.

What is claimed is:

1. A method comprising:
receiving a source lexicon comprising a plurality of tokens, wherein each of said tokens is associated with a sentiment parameter, the sentiment parameter comprising at least a sentiment orientation and a confidence score associated with said sentiment orientation;
automatically selecting, based on specified criteria, a seed set of said tokens from said source lexicon based, at least in part, on an absolute value of the sentiment orientation;
automatically generating a candidate set of tokens from a text corpus comprising a plurality of tokens associated with a target domain, based at least in part, on a similarity parameter between each of said tokens in said candidate set and said seed set, wherein said similarity parameter is obtained by applying a machine learning algorithm to calculate, for each of said tokens, an embedding vector in an embedding space;
automatically calculating a sentiment score for each of said tokens in said candidate set, based, at least in part, on said similarity parameters; and
automatically updating said source lexicon by:
(i) for each token in said candidate set which does not exist in said source lexicon, adding said token to said source lexicon, and
(ii) for each token in said candidate set which exists in said source lexicon, adjusting said sentiment parameter of said token based, at least in part, on interpolating said sentiment parameter and said sentiment score, said interpolating comprising assigning weights to said sentiment parameter and said sentiment score based, at least in part, on said confidence score of said token
wherein the source lexicon is derived from a generic domain of a contact center and the target domain comprises a subset of the generic domain focused on at least one of a specific business area, a specific vendor, or a specific customer service area; and
wherein said text corpus comprises textual transcriptions of interactions of the contact center; and
wherein said interactions:
are between an agent of the contact center and a customer;
include both voice-based and text-based interaction modalities; and
comprise the target domain.

2. The method of claim 1, wherein said selecting comprises at least some of: selecting said tokens with said sentiment parameter above a specified threshold; selecting said tokens with said confidence score above a specified threshold; filtering said tokens which are stop words; filtering said tokens which are named entities; filtering said tokens beginning or ending in punctuation marks; filtering said tokens comprising a single letter; filtering said tokens which are dates; and filtering said tokens which are prepositions.

3. The method of claim 1, wherein, with respect to a token of said candidate set, said sentiment score is equal to a weighted average of all said similarity parameters of said token with each token of said seed set.

4. The method of claim 3, wherein said weightings are determined based, at least in part, on said sentiment orientations of said tokens of said seed set.

5. The method of claim 1, wherein said calculating of said sentiments score for at least some of said tokens in said candidate list further comprises determining, for a token of said candidate list with respect to a token of said seed set:
(i) a similarity score between said tokens of said candidate list and said seed set based on a co-occurrence parameter, and
(ii) a ranking score for said token of said candidate list among all tokens of said candidate list, based on said respective similarity scores.

6. The method of claim 5, further comprising determining an antonym relationship between said tokens of said candidate list and said seed set, based, at least in part, on a specified threshold associated with each of said similarity scores, said ranking scores, and said similarity parameters associated with said tokens of said candidate list and said seed set.

7. The method of claim 5, wherein said co-occurrence parameter is based, at least in part, on a frequency of occurrence of said tokens of said candidate list and said seed set within a text.

8. A system comprising:

at least one hardware processor; and a non-transitory computer-readable storage medium having stored thereon program instructions, the program instructions executable by the at least one hardware processor to:

receive a source lexicon comprising a plurality of tokens, wherein each of said tokens is associated with a sentiment parameter, the sentiment parameter comprising at least a sentiment orientation and a confidence score associated with said sentiment orientation, automatically select, based on specified criteria, a seed set of said tokens from said source lexicon based, at least in part, on an absolute value of the sentiment orientation, automatically generate a candidate set of tokens from a text corpus comprising a plurality of tokens associated with a target domain, based at least in part, on a similarity parameter between each of said tokens in said candidate set and said seed set, wherein said similarity parameter is obtained by applying a machine learning algorithm to calculate, for each of said tokens, an embedding vector in an embedding space, automatically calculate a sentiment score for each of said tokens m said candidate set, based, at least in part, on said similarity parameters, and automatically update said source lexicon by:

(i) for each token in said candidate set which does not exist in said source lexicon, adding said token to said source lexicon, and (ii) for each token in said candidate set which exists in said source lexicon, adjusting said sentiment parameter of said token based, at least in part, on interpolating said sentiment parameter and said sentiment score, said interpolating comprising assigning weights to said sentiment parameter and said sentiment score based, at least in part, on said confidence score of said token wherein the source lexicon is derived from a generic domain of a contact center and the target domain comprises a subset of the generic domain focused on at least one of a specific business area, a specific vendor, or a specific customer service area; and wherein said text corpus comprises textual transcriptions of interactions of the contact center; and wherein said interactions:

are between an agent of the contact center and a customer;

include both voice-based and text-based interaction modalities; and comprise the target domain.

9. The system of claim 8, wherein said selecting comprises at least some of: selecting said tokens with said sentiment parameter above a specified threshold; selecting said tokens with said confidence score above a specified threshold; filtering said tokens which are stop words; filtering said tokens which are named entities; filtering said tokens beginning or ending in punctuation marks; filtering said tokens comprising a single letter; filtering said tokens which are dates; and filtering said tokens which are prepositions.

10. The system of claim 8, wherein, with respect to a token of said candidate set, said sentiment score is equal to a weighted average of all said similarity parameters of said token with each token of said seed set.

11. The system of claim 10, wherein said weightings are determined based, at least in part, on said sentiment orientations of said tokens of said seed set.

12. The system of claim 8, wherein said calculating of said sentiments score for at least some of said tokens in said candidate list further comprises determining, for a token of said candidate list with respect to a token of said seed set:

(i) a similarity score between said tokens of said candidate list and said seed set based on a co-occurrence parameter, and (ii) a ranking score for said token of said candidate list among all tokens of said candidate list, based on said respective similarity scores.

13. The system of claim 12, further comprising determining an antonym relationship between said tokens of said candidate list and said seed set, based, at least in part, on a specified threshold associated with each of said similarity scores, said ranking scores, and said similarity parameters associated with said tokens of said candidate list and said seed set.

14. The system of claim 12, wherein said co-occurrence parameter is based, at least in part, on a frequency of occurrence of said tokens of said candidate list and said seed set within a text.

* * * * *